United States Patent [19]

Yukimoto et al.

[11] Patent Number: 4,902,575

[45] Date of Patent: Feb. 20, 1990

[54] METHOD OF APPLYING ALKYD PAINTS TO OXYALKYLENE POLYMERS HAVING A REACTIVE SILICON GROUP

[75] Inventors: Sadao Yukimoto; Toshifumi Hirose; Katsuhiko Isayama, all of Hyogo, Japan

[73] Assignee: Kanegafuchi Kagaku Kogyo Kabushiki Kaisha, Osaka, Japan

[21] Appl. No.: 288,177

[22] Filed: Dec. 22, 1988

[30] Foreign Application Priority Data

Dec. 26, 1987 [JP] Japan .................. 62-330891

[51] Int. Cl.$^4$ .............................. B32B 9/04
[52] U.S. Cl. ..................... 428/447; 428/480; 525/100; 525/403; 525/409; 524/366; 528/25; 528/26; 528/29

[58] Field of Search .............. 427/393.5; 428/447, 428/480; 525/100, 403, 409; 524/366; 528/25, 26, 29

[56] References Cited

U.S. PATENT DOCUMENTS

| | | | |
|---|---|---|---|
| 4,463,115 | 7/1984 | Hirose et al. | 525/403 X |
| 4,665,127 | 5/1987 | Hirose et al. | 525/403 X |
| 4,687,818 | 8/1987 | Kawakubo et al. | 525/403 X |

*Primary Examiner*—Michael Lusignan
*Attorney, Agent, or Firm*—Armstrong, Nikaido, Marmelstein, Kubovcik & Murray

[57] ABSTRACT

A method of coating the cured product of an oxyalkylene polymer having reactive silicon groups with an alkyd paint. The oxyalkylene polymer is combined with a high-molecular weight plasticizer and the composition is cured and the cured product coated with an alkyd paint.

4 Claims, No Drawings

METHOD OF APPLYING ALKYD PAINTS TO OXYALKYLENE POLYMERS HAVING A REACTIVE SILICON GROUP

FIELD OF THE INVENTION

The present invention relates to a method of applying alkyl paints to the cured product of an oxyalkylene polymer having a silicon-containing group that has a hydroxyl group or a hydrolyzable group bonded to a silicon atom and is capable of crosslinking by forming a siloxane bond (this silicon-containing group is hereinafter referred to as a reactive silicon functional group).

BACKGROUND OF THE INVENTION

Similar to room-temperature curable silicone rubbers, oxyalkylene polymers having a reactive silicon functional group are cured with moisture in the air or the like at room temperature to provide a rubbery product. The resulting cured product has excellent characteristics, e.g., high elongation, strength and adhesion, and thus is useful in such applications as sealants and adhesives.

One of the advantages offered by oxyalkylene polymers having a reactive silicon functional group is that because their backbone chain is composed of an oxyalkylene polymer, the surface of their cured product can be coated with almost all paints in common use. In contrast, silicone rubbers, when cured, provide a water- and oil-repellent surface and coating them with paints is impossible in practice.

However, even a composition of an oxyalkylene polymer that contains a reactive silicon functional group suffers the problem that if the composition contains a plasticizer, the film of an alkyd paint applied to the cured composition will not dry (cure) rapidly enough to justify the commercial use of the alkyd paint on the cured composition. Because of this problem, painters have almost given up in their efforts to coat cured products of oxyalkylene polymers containing plasticizers with alkyd paints.

SUMMARY OF THE INVENTION

Before the completion of the present invention, even the cause of poor drying of alkyd paints on plasticizer-containing oxyalkylene polymers had been entirely unknown. However, the present inventors conducted intensive studies to unravel this phenomenon and found that the drying property of alkyd paint films would be impaired when a low-molecular weight plasticizer was incorporated in a curable composition that contained an oxyalkylene polymer having a reactive silicon functional group. Plasticizers are used when it is necessary to reduce the viscosity of the composition (so as to facilitate its handing in use) or to improve the tensile characteristics of the cured product. Since the use of plasticizers in one of the most convenient method for reducing the viscosity of compositions or improving the tensile characteristics of their cured product, the present inventors searched for plasticizers that could be used without impairing the drying property of alkyd paints. As a result, the present inventors found that this problem could be solved by using plasticizers that are generally referred to as "high-molecular weight plasticizers". The present invention has been accomplished on the basis of this finding.

The present invention relates to a method of applying an alkyd paint to the cured product of a composition that contains 1 to 150 parts by weight (the term "parts" as used hereinafter shall be on a weight basis) of plasticizer per 100 parts of an oxyalkylene polymer having at least one silicon-containing group that has a hydroxyl group or a hydrolyzable group bonded to a silicon atom and which is capable of crosslinking by forming a siloxane bond comprising using as the plasticizer, a high-molecular weight plasticizer.

DETAILED DESCRIPTION OF THE INVENTION

An oxyalkylene polymer having at least one reactive silicon functional group in its molecule [this polymer is hereinafter referred to as oxyalkylene polymer (A)]is used in the present invention. Examples of oxyalkylene polymer (A) are disclosed in many patents such as U.S. Pat. Nos. 3,971,751, 3,979,384, and 4,323,488, and JP-B- No. 45-36319, JP-B- No. 46-12154 and JP-B- No. 4932673, as well as in JP-A- No. 50-156599, JP-A- No. 51-73561, JP-A- No. 54-6096, JP-A- No. 55-82123, JP-A- No. 55-123620, JP-A- No. 55-125121, JP-A- No. 55-131022, JP-A- No. 55-135135 and JP-A- No. 55-137129 (the terms "JP-A" and "JP-B" used herein means an unexamined published Japanese patent application and examined Japanese patent publication, respectively). The disclosure of these patents and publications are incorporated herein by references.

The molecular chain of oxyalkylene polymer (A) preferably has a recurring unit that is represented by the general formula:

where $R^1$ is a substituted or unsubstituted divalent hydrocarbon group having 1 to 8 carbon atoms, preferably a hydrocarbon group having 3 or 4 carbon atoms.

Specific examples of $R^1$ include:

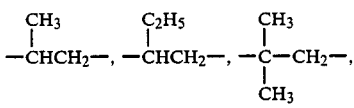

$-CH_2CH_2CH_2CH_2-$, etc.

The molecular chain of the oxyalkylene polymer can be composed of recurring units of a single type or two or more different types. A particularly preferred example of $R^1$ is

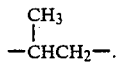

The molecular chain of oxyalkylene polymer (A) can contain recurring unit other than $-R^1-O-$. In such a case it is preferable that the amount of the recurring units $-R^1-O-$ in oxyalkylene polymer (A) exceeds 60 wt %, specifically 80 wt % of said polymer.

The reactive silicon functional groups in oxyalkylene polymer (A) or the silicon-containing functional groups that are capable of crosslinking by forming siloxane bonds, are well known in the art and are characterized by their ability to crosslink even at room temperature. Typical examples of such reactive silicon functional groups are represented by general formula (I):

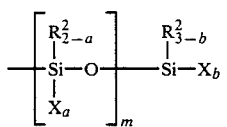

where each $R^2$ is a substituted or unsubstituted monovalent organic group having 1 to 20 carbon atoms which may be the same or different; X is a hydroxyl group or a hydrolyzable group; a is 0 or an integer of 1 or 2; b is 0 or an integer of 1, 2 or 3, with the proviso that $1 \leq$ (the sum of a and b), and preferably $1 \leq$ (the sum of a and b)$\leq 4$; and m is 0 or an integer of 1 to 19. Not all of the m units

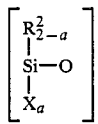

are necessarily the same.

Reactive silicon functional groups which are preferred for such reasons as economy are represented by general formula (II):

where $R^2$, X and b are the same as defined above.

Specific examples of the hydrolyzable group X in formula (I) include a halogen atom, a hydrogen atom, an alkoxy group, an acyloxy group, a ketoximate group, an amino group, an amido group, an aminooxy group, a mercapto group and an alkenyloxy group. Among these examples, alkoxy groups such as methoxy and ethoxy are preferred since they will undergo mild hydrolysis.

Specific examples of $R^2$ in formula (I) or (II) include alkyl groups having 1 to 20 carbon atoms such as methyl and ethyl, cycloalkyl groups having 3 to 20 carbon atoms such as cyclohexyl, aryl groups having 6 to 20 carbon atoms such as phenyl, and aralkyl groups having 7 to 20 carbon atoms such as benzyl. In formula (I) or (II), $R^2$ may be a triorganosiloxy group represented by the following formula:

(R')$_3$SiO—

R' is a substituted or unsubstituted monovalent organic group, preferably hydrocarbon groups having 1 to 20 carbon atoms, such as methyl, phenyl, etc., provided that the three R' are not necessarily the same. A particularly preferred example of $R^2$ in formula (I) or (II) is methyl.

In order to ensure satisfactory curability, the oxyalkylene polymer (A) preferably contains an average of at least 1, more preferably at least 1.1, and most preferably 1.5 to 4 reactive silicon functional groups per molecule. Such reactive silicon functional groups are preferably present at terminals of the molecular chain of the oxyalkylene polymer (A).

The oxyalkylene polymer (A) has a number average molecular weight which preferably ranges from 3,000 to 30,000, more preferably from 5,000 to 15,000. Oxyalkylene polymers (A) may be used either alone or in combination.

The oxyalkylene polymer (A) may be prepared by performing an addition reaction between (a) a hydrosilyl compound such as a compound having a formula in which hydrogen is bonded to a groups of general formula (I) and (b) an oxyalkylene polymer containing an unsaturated group represented by general formula (III):

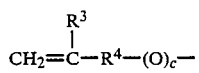

(where $R^3$ is a hydrogen atom or a monovalent organic group having 1 to 20 carbon atoms; $R^4$ is a divalent organic group having 1 to 20 carbon atoms; and c is 0 or 1) in the presence of a catalyst made of a metal of group VIII such as platinium.

Other examples of methods for preparing the oxyalkylene polymer (A) are described below:

(1) reacting a hydroxyl-terminated polyoxyalkylene with a polyisocyanate compound such as toluene diisocyanate to form an isocyanate-terminated alkylene oxide polymer, and subsequently reacting the terminal isocyanate group with a W group is a silicon compound represented by general formula (IV):

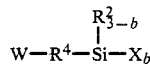

where W is an active hydrogen containing group selected from among a hydroxyl group, a carboxyl group, a mercapto group and an amino group (primary or secondary); and b, R2, R4 and X are each the same as defined above;

(2) performing an addition reaction between an unsaturated group in an unsaturated group-containing polyoxyalkylene represented by formula (III) and a mercapto group in a silicon compound of formula (IV) where W is a mercapto group; and (3) reacting a hydroxyl group in a hydroxyl-terminated polyoxyalkylene with a compound represented by general formula (V):

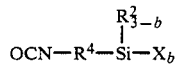

where $R^2$, $R^4$, X and b are each the same as defined above. It should be noted, however, that the oxyalkylene polymer (A) may be prepared by other methods.

In the preparation of oxyalkylene polymer (A) part or all of the X groups in the reactive silicon functional group may be converted to other hydrolyzable groups or a hydroxyl group. If an X group is a halogen atom or hydrogen atom, it is preferably converted to an alkoxy, acyloxy, aminoxy, alkenyloxy, hydroxyl group or some other group. In formula (III), $R^3$ is a hydrogen atom or a substituted or unsubstituted monovalent organic group having 1 to 20 carbon atoms, and is preferably a hydrogen atom or a hydrocarbon group, with the former being particularly preferred. In formula (III), (IV), or (V), $R^4$ is a divalent organic group having 1 to 20 carbon atoms and is preferably $-R^5-, -R^5OR^5-, -R^5-O\overset{O}{\underset{\|}{C}}-, -R^5N\overset{O}{\underset{\|}{H}}C- \text{ or } -R^5\overset{O}{\underset{\|}{C}}-$ (where $R^5$ is a divalent hydrocarbon group having 1 to 10 carbon atoms), with a methylene group being particularly preferred.

The unsaturated group-containing alkylene oxide polymer may be prepared by various methods, such as a method in which unsaturated groups are introduced to hydroxyl-terminated polyoxyalkylene by using ether, ester, urethane or carbamate linkages as disclosed in JP-A- No. 54-6097 and a method in which an epoxy compound such as ethylene oxide or propylene oxide is polymerized with an unsaturated group-containing epoxy compound such as allyl glycidyl ether producing an alkylene oxide polymer having an unsaturated group in the side chain.

The high-molecular weight plasticizer which is combined with the oxyalkylene polymer (A) modifies mechanical characteristics such as tensile strength and elongation of the cured product of the composition. This high-molecular weight plasticizer also serves as a component for improving the drying property of an alkyd paint film applied to the cured product as compared to the drying property where low-molecular weight plasticizers are used. Preferable high molecular weight plasticizers are polymeric plasticizers.

The molecular weight of this high-molecular weight plasticizer preferably ranges from 500 to 15,000, more preferably from 700 to 10,000.

Specific examples of this high-molecular weight plasticizer include but are not limited to: polyester based plasticizers such as polyesters of dibasic acids and dihydric alcohols, the examples of dibasic acids being phthalic acid, isophthalic acid, terephthalic acid, tetrahydrophthalic acid, polybutadiene dicarboxylic acid, oxalic acid, malonic acid, succinic acid, sebacic acid, maleic acid, fumaric acid, and cyclopentadiene dicarboxylic acid and the examples of dihydric alcohols being ethylene glycol, propylene glycol, butane diol, hexamethylene glycol, hydrogenated bisphenol A, neopoentyl glycol, polybutadiene diol, diethylene glycol, triethylene glycol and dipropylene glycol; polyethers such as polyoxyethylene, polyoxypropylene, polyoxyethyleneoxypropylene, polyoxytetramethylene, polyoxytetramethyleneoxypropylene and polyepichlorohydrin; polystyrenes such as poly-α-methylstyrene and polystyrene; polybutadiene; butadieneacrylonitrile copolymer; polychloroprene; polyisoprene; polybutene and chlorinated paraffins. Among these compounds, polyesters, polyethers, polystyrenes, polybutadiene and polybutene are preferred from the viewpoints of miscibility and viscosity. The above-listed high-molecular weight plasticizers may be used either on their own or an admixtures. They may be incorporated as solvents in the preparation of the oxyalkylene polymer (A).

The high molecular weight plasticizer is used in an amount of 1 to 150 parts, preferably 10 to 120 parts, more preferably 20 to 100 parts, per 100 parts of the oxyalkylene polymer (A). If less than 1 part of the high-molecular weight plasticizer is used, the intended plasticizing effect will not be exhibited. If more than 150 parts of the high-molecular weight plasticizer are used, the resulting cured product will have insufficient mechanical strength.

The composition consisting of the oxyalkylene polymer (A) and the high-molecular weight plasticizer may contain a cure accelerator, a filler and other suitable additives as required.

Useful cure accelerators include organotin compounds, acidic phosphate esters, the reaction products of acidic phosphate esters and amines, saturated or unsaturated polyvalent carboxylic acids or acid anhydrides thereof, and organotitanate compounds.

Exemplary organotin compounds include dibutyltin dilaurate, dioctyltin dimaleate, dibutyltin phthalate, tin octylate and dibutyltin methoxide.

Acidic phosphate esters are those phosphate esters containing $-O-\overset{O}{\underset{\underset{OH}{|}}{\overset{\|}{P}}}-$ such as organic acidic phosphate esters represented by $(R-O)_d-\overset{O}{\underset{\|}{P}}-(OH)_{3-d}$ (where d is 1 or 2, and R is an organic residue), and may be exemplified by the following:

$(CH_3O)_2\overset{O}{\underset{\|}{P}}OH, (CH_3O)\overset{O}{\underset{\|}{P}}(OH)_2, (C_2H_5O)_2\overset{O}{\underset{\|}{P}}OH, (C_2H_5O)\overset{O}{\underset{\|}{P}}(OH)_2,$ $[(CH_3)_2CHO]_2\overset{O}{\underset{\|}{P}}OH, (CH_3)_2CHO\overset{O}{\underset{\|}{P}}(OH)_2, (C_4H_9O)_2\overset{O}{\underset{\|}{P}}OH,$ $(C_4H_9O)\overset{O}{\underset{\|}{P}}(OH)_2, (C_8H_{17}O)_2\overset{O}{\underset{\|}{P}}OH, (C_8H_{17}O)\overset{O}{\underset{\|}{P}}(OH)_2,$ $(C_{10}H_{21}O)_2\overset{O}{\underset{\|}{P}}OH, (C_{10}H_{21}O)\overset{O}{\underset{\|}{P}}(OH)_2, (C_{13}H_{27}O)_2\overset{O}{\underset{\|}{P}}OH,$ $(C_{13}H_{27}O)\overset{O}{\underset{\|}{P}}(OH)_2, (HO-C_8H_{16}O)_2\overset{O}{\underset{\|}{P}}OH, (HO-C_8H_{16}O)\overset{O}{\underset{\|}{P}}(OH)_2,$ $(HO-C_6H_{12}O)_2\overset{O}{\underset{\|}{P}}OH, (HO-C_6H_{12}O)\overset{O}{\underset{\|}{P}}(OH)_2,$ $[(CH_2OH)(CHOH)O]_2\overset{O}{\underset{\|}{P}}OH, [(CH_2OH)(CHOH)O]\overset{O}{\underset{\|}{P}}(OH)_2,$ $[(CH_2OH)(CHOH)C_2H_4O]_2\overset{O}{\underset{\|}{P}}OH, \text{ and}$ $[(CH_2OH)(CHOH)C_2H_4O]\overset{O}{\underset{\|}{P}}(OH)_2.$ Exemplary organotitanate compounds are titanate esters such as tetrabutyl titanate, tetraisopropyl titanate and triethanolamine titanate.

If cure accelerators are used, they are preferably added in amounts of 0.1 to 20 parts per 100 parts of the oxyalkylene polymer (A).

Illustrative fillers include ground calcium carbonate, precipitated calcium carbonate, gelatinous calcium carbonate, kaolin, talc, silica, titanium oxide, aluminum silicate, magnesium oxide, zinc oxide and carbon black.

Other additives that can be used include anti-sag agents such as hydrogenated castor oil and organic bentonite, colorants, antioxidants, etc.

Needless to say, the composition for use in the present invention may employ dioctyl phthalate and other low-molecular weight plasticizers in combination with the high-molecular weight plasticizer as long as the intended advantages of the present invention are attained.

The so-prepared composition used in the present invention finds uses in applications as adhesives, tackifiers, paints, film waterproofing agents, sealant, molding materials, castable rubber materials and foaming materials.

For use as an architectural sealant, the composition to be used in the present invention is mixed normally with 10 to 300 parts of an inorganic filler such as calcium carbonate, talc or kaolin and, if necessary, an appropriate amount of a pigment such as titanium oxide or carbon black and an antioxidant such as a UV absorbent or radical chain inhibitor, and the ingredients are kneaded completely uniformly in a kneader or a paint roll mill and cured by exposure to moisture to produce a rubber elastomer that shows improved weatherability, transparency and tensile elongation.

In accordance with the present invention, alkyd paints are applied to the cured product obtained in the manner described above. Preferably, alkyd paints are applied to the composition after it has cured almost completely since the surface of the cured product has acquired better characteristics and is easier to paint and because the paint film will not prevent the supply of the necessary amount of moisture for curing. It should, however, be noted that paint application is possible if the composition cures to form a skinning state on its surface. The term "cured product" as used herein should be taken to encompass such a state.

There is no particular limitation on the alkyd paints that can be used in the present invention. Useful paints are those that employ as the principal film-forming element those "oil-modified" alkyd resins which contain the condensation products of polybasic acids (e.g., phthalic anhydride and maleic anhydride) and polyhydric alcohols (e.g., glycerin, pentaerythritol, ethylene glycol and trimethylolethane) modified with fatty oils or fatty acids (e.g., linseed oil, soybean oil, castor oil and safflower oil). Alkyd resins modified with a variety of resins or vinyl monomers can also be used. The alkyd resins to be used in the present invention can be of any types including alkyd resin varnishes and enamels which are used in vehicle, aircraft and other industrial coatings, alkyd resin mixed paints (also called "synthetic resin mixed paints") which are used in architectural, steel bridge and vessel coatings, and alkyd resin primers used as primers on automobiles, machinery, electric appliances, furniture, etc.

The alkyd paints listed above dry more rapidly than oil-based paints and form films that are hard and glossy and which are improved in almost all aspects including adhesion, weatherability, oil resistance and other resistance properties. Since their physical properties can be adjusted over a broad range in accordance with the type and oil length of modifying oils used and the kind of modification, these alkyd paints find utility in various applications.

For some unknown reason, application of alkyd paints to the cured product of a composition containing the oxyalkylene polymer (A) in combination with a low-molecular weight plasticizer has resulted in serious problems such as a marked decrease in the drying speed of paint films and some stickness of the film due to incomplete drying. Therefore, it has generally been believed that application of alkyd paints to the cured product of the composition described above is substantially precluded unless the surface of the composition is first primed or coated with non-alkyd paints. The major advantage of using the composition described herein is that films of ordinary alkyd paints can be formed by ordinary methods on the cured product of the oxyalkylene polymer (A) and plasticizer.

The method of the present invention is hereunder described in greater detail with reference to examples and comparative examples.

The present invention is not to be construed as being limited thereto.

SYNTHESIS EXAMPLE 1

Eight hundred grams of an oxypropylene polymer having an average molecular weight of ca. 8,000 which had allylether groups introduced at 97% of all terminals was charged into a pressure-resistant reaction vessel equipped with a stirrer, which was then charged with 19 g of methyldimethoxysilane. After adding 0.34 ml of a solution of a chloroplatinic acid catalyst (8.9 g of $H_2PtC_6 \cdot 6H_2O$ dissolved in 18 ml of isopropyl alcohol and 160 ml of tetrahydrofuran), reaction was performed at 80° C. for 6 hours.

The amount of residual hydrogenated silicon groups in the reaction solution as determined by IR spectrum analysis was very small and almost negligible. Determination by NMR analysis showed that the resultant oxypropylene polymer was terminated with ca. 1.7

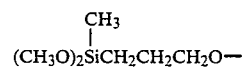

groups per molecule.

EXAMPLES 1 TO 4 AND COMPARATIVE EXAMPLES 1 AND 2

To 100 g of the polymer prepared in Synthesis Example 1, 120 g of calcium carbonate (CCR of Shiraishi Kogyo K.K.), 20 g of titanium dioxide (R820 of Ishihara Sangyo Kaisha, Ltd.), 2 g of dibutyltin diacetylacetonate (cure catalyst U-220 of Nitto Kasei K.K.) and 50 g of one of the plasticizers listed in Table 1 were added. The ingredients were thoroughly kneaded and mixed with a three-roll paint mill and shaped into a sheet 3 mm thick.

Each of the sheets was cured by standing at 23° C. for a day and thereafter coated separately with two kinds of alkyd paint (Rubbol AZ of Sikkens, the Netherlands, and Rockcoat of Rock Paint Corporation). The curability of the paint films was examined after standing at 23° C. for the days shown in Table 1. The results are also shown in Table 1.

"Polybutene HV35" in Table 1 is a polybutene (MW, ca. 750) of Nippon Petrochemicals Co., Ltd.; "Excenol 5030" is a polyether polyol (MW, ca. 5,100) of Asahi Glass Co., Ltd.; "Plasticizer A" is an oxypropylene polymer of $\overline{Mn}=5,200$ and of $\overline{Mw}/\overline{Mn}=1.6$ which has an allylether group at both terminals; "Plasticizer B" is a hydroxy-free oxypropylene polymer of $\overline{Mn}=7,500$ and $\overline{Mw}/\overline{Mn}=1.8$ which has an allylether group at both terminals; "DOP" is di(2-ethylhexyl) phthalate (MW, 391) of Daihachi Chemical Industry Co., Ltd.; and "BBP" is butylbenzyl phthalate (MW, 312) of Daihachi Chemical Industry Co., Ltd.

The curability of paint films was evaluated by a five-point rating system: "4" means that the applied paint cured, with the film surface remaining somewhat sticky; "3" means that a small amount of paint adhered to the tip of a finger when the finger was brought into contact with the coated surface; "2" means that the applied paint cured to some extent but that the paint adhered to the tip of a finger when the finger was brought into contact with the coated surface; "1" means that the applied paint increased in viscosity; "0" means that there was no change at all in the applied paint (i.e., it did not cure); and "5" means that the applied paint cured completely.

TABLE 1

| Example No. | Plasti- cizer | Rubbol AZ | | | Rockcoat | | |
|---|---|---|---|---|---|---|---|
| | | 1 day | 3 days | 7 days | 1 day | 3 days | 7 days |
| 1 | Polybutene HV35 | 1 | 2 | 2 | 2 | 3 | 3 |
| 2 | Excenol 5030 | 0 | 1 | 2 | 1 | 2 | 2 |
| 3 | Plasti- cizer A | 1 | 2 | 2 | 2 | 3 | 3 |
| 4 | Plasti- cizer B | 1 | 2 | 3 | 2 | 3 | 4 |
| Compara- tive Example 1 | DOP | 0 | 0 | 0 | 0 | 0 | 0 |
| Compara- tive Example 2 | BBP | 0 | 0 | 0 | 0 | 0 | 0 |

The date in Table 1 show that the use of low-molecular weight plasticizers result in very slow curing of the alkyd paints (Comparative Examples 1 and 2), i.e., the paints did not cure at all even after standing for 7 days at 23° C. On the other hand, the use of high molecular weight plasticizers resulted in improved curability of the alkyd paints (Examples 1 to 4).

REFERENTIAL EXAMPLE

The curability of the alkyd paints was evaluated as in Example 1 except that they were applied to an ordinary substrate rather than the cured product of an oxypropylene polymer. The results are shown in Table 2.

TABLE 2

| Rubbol AZ | | Rockcoat | |
|---|---|---|---|
| 1 day | 2 days | 1 day | 2 days |
| 4 | 5 | 4 | 5 |

While the invention has been described in detail and with reference to specific embodiments thereof, it will be apparent to one skilled in the art that various changes and modifications can be made therein without departing from the spirit and scope thereof.

What is claimed is:

1. A method of coating the cured product of an oxyalkylene polymer with an alkyd paint comprising
   (a) combining an oxyalkylene polymer having at least one silicon-containing group that has a hydroxyl group or a hydrolyzable group bonded to a silicon atom and is capable of crosslinking by forming a siloxane bond with a high-molecular weight plasticizer, the amount of the plasticizer being 1–150 parts per 100 parts by weight of the polymer;
   (b) curing the composition comprising the oxyalkylene polymer and plasticizer; and
   (c) coating the cured product with an alkyd paint.

2. The method of claim 1, wherein the high-molecular weight plasticizer has a molecular weight of from 500 to 15,000.

3. The method of claim 1, wherein the oxyalkylene polymer contains an average of at least one of said silicon-containing groups per molecule.

4. The coated product obtained by the method of claim 1.

* * * * *